United States Patent Office 3,635,938
Patented Jan. 18, 1972

3,635,938
TECHNIQUE FOR ENHANCING THE ABILITY OF POLYMER TO BOND WITH ADHESIVE AND RESULTANT POLYMER
Francis W. Ryan, Millington, and Harold Schonhorn, New Providence, N.J., assignors to Bell Telephone Laboratories, Incorporated, Murray Hill, N.J.
No Drawing. Original application Feb. 17, 1967, Ser. No. 616,785, now Patent No. 3,520,753. Divided and this application Dec. 19, 1969, Ser. No. 886,755
Int. Cl. C08f 29/04, 29/16; C08g 20
U.S. Cl. 260—94.9
5 Claims

ABSTRACT OF THE DISCLOSURE

Hydrocarbon, fluorocarbon and polyamide polymers destined for bonding with adhesives are melted upon a high energy metal or metal oxide surface, cooled and separated therefrom by dissolution of the latter. The resultant materials are capable of bonding with any conventional adhesive, yielding superior bond strengths.

---

This application is a division of copending application, Ser. No. 616,785, filed Feb. 17, 1967, U.S. Pat. 3,520,753.

This invention relates to a technique for enhancing the ability of polymeric materials to form a seal with an adhesive and to the resultant polymers. More particularly, the present invention relates to a technique for treating hydrocarbon, fluorocarbon or polyamide polymers to improve their ability to form an adhesive bond.

It has generally been accepted in the adhesives industry that the noted polymers generally cannot be bonded with commercially available adhesives in the absence of a preliminary surface modification, such as oxidation, defluorination, and so forth, Unfortunately, the various surface modifications proposed by the industry tend to improve one property at the expense of another, so resulting in a composition which is undesirable in many applications.

A technique for overcoming these limitations is described by R. H. Hansen and H. Schonhorn in U.S. Pat. 3,462,335, issued Aug. 19, 1969. The technique described therein involves bombarding a hydrocarbon, fluorocarbon or polyamide polymer, destined for bonding with an adhesive, with a stream of an excited inert gas. The resultant compositions were found to retain their original electrical characteristics as well as the chemical integrity. Although this technique has proven completely satisfactory in all applications, the attention of workers in the art has been focused upon more economical procedures for effetcing similar ends.

In accordance with the present invention, such end is attained by a novel procedure wherein the polymer destined for bonding is melted upon a high energy surface so as to effect wetting thereof, cooled and separated from the surface by dissolution of the latter in a suitable solvent. Compositions treated in the described manner are also found to retain their original electrical characteristics and chemical integrity and are capable of bonding with conventional adhesives so as to result in structures evidencing tensile shear strengths comparable to those obtained by means of the technique described in the copending application alluded to hereinabove.

It will be understood by those skilled in the art that the main impact of the present invention resides in the discovery that the noted polymers may be economically bonded with conventional adhesives without undergoing a preliminary surface modification with the concomitant degradation of electrical properties.

The invention has been described largely in terms of bonding polymers with epoxy adhesives. However, it will be understood that the polymers described herein may be bonded with any conventional adhesive utilized in the industry, for example, polyamides, polyurethanes, polysulfides, silicone, and so forth.

The polymers employed in the practice of the present invention may be selected from among hydrocarbon, fluorocarbon, or polyamide polymers evidencing weak boundary layers as manifested by their inability to form strong adhesive joints. Typical polymers suitable in the practice of the present invention are polyethylene, polypropylene, nylon, polytetrafluoroethylene, poly(vinyl fluoride), and so forth.

The adhesive employed herein may be selected from among any of the commercially available materials. However, in order to obtain high joint strengths, the adhesive is required to wet the substrate appreciably, id est, it should evidence a surface tension less than 50 dynes per cm. In order to utilize material manifesting surface tensions beyond the noted maximum, a surfactant may be employed to attain the required level. A particularly useful adhesive for the practice of the invention comprises a mixture of the diglycidyl ether of bisphenol A and diethylaminopropylamine.

As noted, the inventive technique involves melting a polymeric material onto a high energy surface, which, for present purposes, is defined as any surface manifesting a surface tension of at least 50 dynes per cm. Materials particularly suited for this purpose are gold, aluminum, mercury, tin, iron, and so forth.

The first step of the inventive technique involves cleansing both the polymer of interest and the high energy surface with conventional solvents for the purpose of removing surface debris. Thereafter, the polymer is heated for a time period and at a temperature sufficient to effect melting thereof, the specific temperature and duration of heating being dependent upon the polymer selected. It will be understood by those skilled in the art that the ultimate joint strength of the bond is dependent in part upon the extent of wetting attained in this stage of the operation, an optimum condition being the attainment of a contact angle of 0°. Accordingly, the duration of heating is dictated by considerations relating to the time required to obtain a contact angle approaching 0°.

Subsequent to melting, the resultant assembly is cooled to room temperature by any suitable means. It has been theorized that during the cooling cycle of the process extensive nucleation of the polymer occurs, resulting in the formation of a transcrystalline region which in turn causes the formation of a plurality of entanglements in the surface region which act as crosslinks and preclude the formation of a weak boundary layer.

Thereafter, the cooled polymer is separated from the high energy surface or substrate by dissolving the surface in any suitable solvent. Studies have revealed that removal by other techniques as, for example, peeling, results in the destruction of the surface region and may cause exposure of a deleterious weak boundary layer.

Next, the polymer may be stored until ready for use or immediately bonded with the adhesive of interest. The adhesive is applied uniformly to the surface of a sheet of the polymer and the coated polymer maintained at a temperature ranging from room temperature to a point just below the melting temperature for a period sufficient to permit curing of the adhesive, thereby forming a structural joint between the polymer and the adhesive.

Examples of the present invention are described in detail below. These examples are included merely to aid in the understanding of the invention and variations may be made by one skilled in the art without departing from the spirit and scope of the invention.

EXAMPLE I

A 1" x 3" x 10 mil sample of polyethylene obtained from commercial sources was washed with acetone, dried in air and placed between a pair of 1" x 3" sections of 0.6 mil aluminum foil previously treated with a (sulfuric acid-sodium dichromate) (sulfochromate) solution. The resultant assembly was next placed between a pair of heated platens and heated at a temperature of 175° C. for 30 minutes. Then the assembly was cooled to room temperature by passing cold water through the platens. The polyethylene was next separated from the foil by dissolving the latter at room temperature in a 20 percent sodium hydroxide solution. The polyethylene was then examined and it was determined that the surface resistivity and wettability were the same as the starting material.

An epoxy resin diglycidyl ether of bisphenol-A was selected for use in preparing an epoxy adhesive. The resin obtained from commercial sources evidenced an epoxy equivalent weight of 179, a total chloride content less than 0.1 percent, by weight, and a viscosity of 6,400 centipoises 25 °C.

Diethylaminopropylamine obtained from commercial sources was distilled under nitrogen through a 6 inch Vigreaux column, and the first fraction discarded. The product distilling at 68° C. and 26 millimeters of pressure was stored in a dark container prior to use.

An epoxy adhesive was prepared by mixing 100 parts, by weight, of the above-described resin with 7 parts, by weight, of the diethylaminopropylamine. The mixture was thoroughly stirred until uniform and applied immediately to the surface of the polyethylene. The resultant assembly was maintained at a temperature of 70° C. for approximately 15 hours. In order to determine tensile shear strength of the resultant structure, composites were prepared in accordance with the following procedure.

Metal tensile shear adherends 5 x 1 x 1/16 inch of 2024-T3 aluminum, obtained from commercial sources, were selected. The surfaces of the adherends were subjected to vapor degreasing in trichloroethylene in accordance with conventional procedures and subsequently etched for 7 minutes at 65° C. in a solution comprising one part, by weight, sodium dichromate, 30 parts, by weight, water, and 10 parts, by weight, of 95 percent sulfuric acid. Following the etching step, the adherends were rinsed for five minutes in running tap water, for one minute in running distilled water, and then dried in a forced air oven at 60° C. The adherends were then stored in a desiccator until ready for use.

For the measurement of tensile shear strength, composite test pieces comprising aluminum-epoxy adhesive-polyethylene-epoxy adhesive-aluminum were prepared for bonding in a device designed to maintain a 1/2" overlap, the thickness of the epoxy adhesive being maintained constant by insertion of a piece of 0.003" diameter wire in each glue line between the aluminum and polyethylene. Bonding of the aluminum to the epoxy adhesive in polyethylene structure was effected at a pressure of 20 lbs. per square inch by placing the composites in forced air ovens maintained at 70° C. for 16 hours. The bonded structures were tested in accordance with ASTM D1002-53T, except that the strain rate was 0.1" per minute. The tensile shear strength of the structure was approximately 2500 lbs. per square inch at 23° C.

For comparative purposes, a prior art polyethylene-epoxy adhesive bond was formed by directly melting polyethylene between aluminum strips coated with the above-described adhesive. Tensile shear strength of the resultant structure as determined in accordance with ASTM D1002-53T was approximately 2000 lbs. per square inch at 23° C.

EXAMPLE II

The procedure of Example I was repeated with the exception that nylon, obtained from commercial sources, was employed. The tensile shear strength of the resultant structure was approximately 3000 p.s.i. at 23° C.

EXAMPLE III

The procedure of Example I was repeated with the exception that polytetrafluoroethylene, obtained from commercial sources, was employed. The tensile shear strength of the resultant structure was approximately 2500 p.s.i. at 23° C.

What is claimed is:

1. A polymer coating capable of forming a bond with an adhesive, said polymer being selected from the group consisting of (a) hydrocarbons, (b) fluorocarbons, and (c) polyamides, characterized in that the said polymer has been maintained, while melted, in contact with a high energy metal or metal oxide surface evidencing a surface tension of at least 50 dynes per centimeter for a time period sufficient to effect wetting thereof, cooling the resultant assembly to room temperature and separating the surface from the polymer coating by dissolving said surface in a solvent therefor.

2. A polymer in accordance with claim 1 comprising polyethylene.

3. A method in accordance with claim 1 wherein said polymer is polyethylene.

4. A method in accordance with claim 1 wherein said high energy surface is aluminum.

5. The method of treating a polymer selected from the group consisting of hydrocarbons, fluorocarbons and polyamides, to produce on the polymer a surface having improved ability to form an adhesive bond comprising melting a polymer selected from the group consisting of hydrocarbons, fluorocarbons and polyamides onto a metal or metal oxide surface evidencing a surface tension of at least 50 dynes per centimeter and maintaining the polymer coating in contact with the surface for a time period sufficient to effect wetting thereof, cooling the resultant assembly to room temperature and separating the surface from the polymer coating by dissolving said surface in a solvent therefor.

References Cited
UNITED STATES PATENTS 2,668,134  2/1954  Horton _____ 260—94.9 X JOSEPH L. SCHOFER, Primary Examiner W. F. HAMROCK, Assistant Examiner U.S. Cl. X.R.

260—78 S, 92.1, 93.7, 96